July 23, 1963　　　　E. ENK ETAL　　　　3,098,741
PROCESS FOR EFFECTING CRUCIBLELESS MELTING OF MATERIALS
AND PRODUCTION OF SHAPED BODIES THEREFROM
Filed March 31, 1959
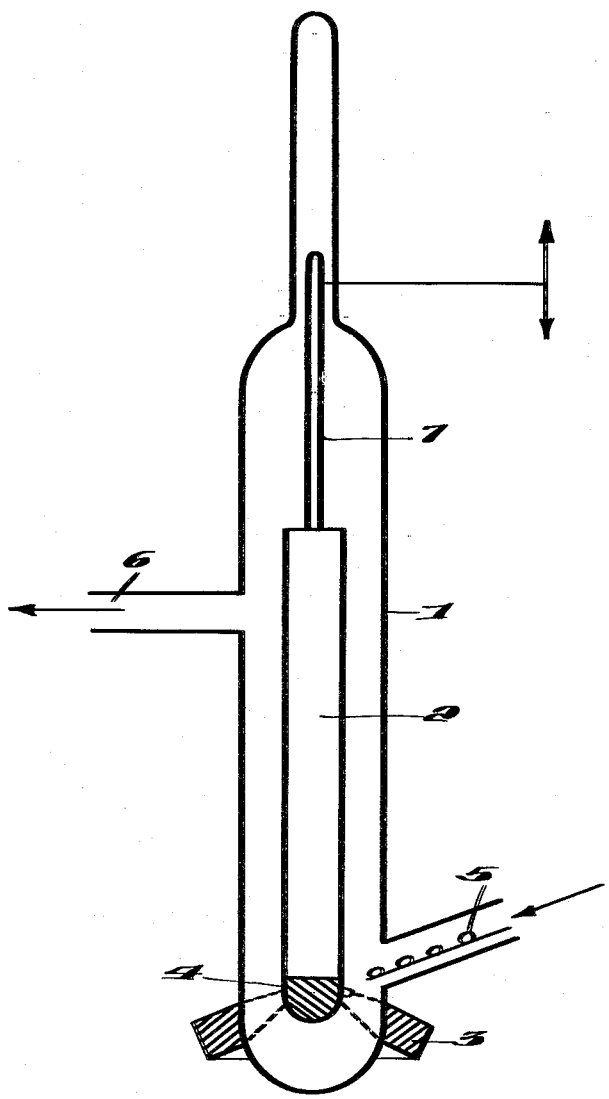
INVENTORS
EDUARD ENK,
JULIUS NICKL,
BY
Bailey, Stephenson & Huettig
ATTORNEYS 3,098,741
PROCESS FOR EFFECTING CRUCIBLELESS MELT-
ING OF MATERIALS AND PRODUCTION OF
SHAPED BODIES THEREFROM
Eduard Enk and Julius Nickl, Burghausen-Upper Bavaria,
Germany, assignors to Wacker-Chemie G.m.b.H.,
Munich, Germany
Filed Mar. 31, 1959, Ser. No. 803,271
Claims priority, application Germany Apr. 3, 1958
3 Claims. (Cl. 75—65)

The present invention relates to an improved process for the melting of materials and production of shaped bodies therefrom and more particularly to a process in which the melted material from which the shaped bodies are produced need not be confined in a crucible.

For many purposes it is desirable to produce rods, tubes, plates, spheres, vessels, wires or combinations of such shapes and other shapes of extremely pure substances and in many instances the starting materials employed cannot become contaminated in the production of shaped bodies.

According to the invention it was found that such shaped bodies can be produced by supplying material from which the shaped body is to be produced, preferably in solid form, to a downwardly free hanging fused zone.

The process according to the invention is of extremely wide application with regard to the materials from which the shaped bodies are to be produced. For example, it may be applied to metals, non-metals, alloys, ionogenically built up compounds, such as salts, metal-organic compounds, organic compounds of non-metals, organic compounds, such as aliphatic, aromatic, aliphatic-aromatic compounds both in monomeric and in polymeric form.

The accompanying drawing diagrammatically shows one form of apparatus suitable for carrying out the process according to the invention.

The process according to the invention can, for example, be carried out in such apparatus by suspending, for example, a tube 2, which is to be lengthened, of extremely pure material on a mounting 7, which preferably is adjustable, within vessel 1. A freely hanging ring shaped fused zone 4 is provided at the lower end of tube 2 with the aid of a source of ultra red rays 3 or other heating arrangements. Care must be taken that such fused zone remains ring shaped and that it does not run together to a drop. When such fused zone has been established, the starting material in granular form is supplied grainwise to the fused zone through inlet 5. The supply of such granular material may be assisted by use of a vibrating conveying arrangement or an electric wind or a stream of inert gas.

The process according to the invention is, however, not limited to the use of granular or powdered material in supplying the material to the fused zone. It is also possible to supply a thin rod, wire or thread of the starting material to the fused zone wherein it is slowly liquefied. The liquefication of the solid starting material can be carried out in an inert or purifying gaseous atmosphere or under vacuum.

During the supply of the material to the fused zone of the tube the latter is slowly raised.

In suitable instances a protective gas or a purifying gas can be supplied to vessel 1 over connection 6, or such vessel can be evacuated over such connection. Eventual impurities which may be contained in the starting material can be removed by the application of vacuum. For example, oxygen in the form of dissolved oxygen or in the form of oxides may be removed as oxygen or suboxides by the application of such vacuum.

Hydrogen, for example, can serve as a purifying gas in the purification of oxygen containing silver. Protective gases hinder oxidation and therefore slagging of the material. Superatmospheric pressures can also be employed in the process according to the invention.

It is also possible according to the invention to melt solid materials and to shape them into drops or spheres. In this instance it is only necessary to permit the fused drop on a rod to grow until it tears off by itself or is caused to separate from the rod by a suitable arrangement. The separation of the drop from the rod can, for example, be advantageously effected by applying an electrical potential to the rod, by vibrating or rapping the rod or by effecting an electromagnetic eddy.

It was furthermore found that shaped bodies in monocrystalline or polycrystalline form can also be produced according to the invention when the free hanging fused zone is surrounded by a melt or a liquid.

The surrounding liquid can envelop the free hanging fused zone alone or both the free hanging fused zone and the formed body from which it hangs. In such instance the fused zone and shaped body or only the fused zone can dip into a melt or liquid held in a vessel. It is, however, also possible only to maintain a thin melted or liquid film on the fused zone and/or on the solid body.

The surrounding or coating liquid or melt should have no or at most only a slight disturbing influence on the free hanging fused zone or on the solid body. Furthermore, in the selection of the melt or liquid care should be taken that it possesses a sufficient miscibility gap with reference to the free hanging fused zone. The density of the surrounding or coating melt or liquid is advantageously selected so that it is of the order of the free hanging fused zone. The density thereof also can be well below that of the free hanging fused zone but it should not be substantially greater than that of the fused zone. The differences in the densities can be employed to influence the shape of the free hanging fused zone as the diameter and surface form of a rod will be determined by the shape of the fused drop from which it is produced. The same is true of tubes in the production of which a downwardly free hanging ring shaped fused zone is employed. It is possible also to influence the rod diameter, tube wall thickness and the surfaces by the continuous or partial alteration of the surrounding melt or liquid.

The surrounding melt or liquid can either supply materials to or withdraw materials from the body to be shaped, particularly the downwardly free hanging fused zone. When the liquid or melt takes up materials from the downwardly free hanging fused zone or from the body which has already solidified, it can be used to purify the material to be shaped. Such purification can be either chemical or physical.

The reverse can also be true in that the surrounding liquid or melt can supply materials to the material to be shaped which are incorporated in the solid material of the body or in the fused zone. The incorporation of materials from the surrounding liquid medium can be employed to alter the physical or chemical properties of the shaped body produced, for example, its electrical conductivity, its type of conductivity, its chemical composition or its optical properties. Fundamentally, other properties can also be influenced thereby. In semi-conductor materials this measure can be employed to achieve a desired doping.

The liquid medium surrounding the free hanging fused zone can consist of one or more materials. Suitable substances are organic and/or inorganic compounds, as well as ionogenically or homopolarly built up substances which are liquid or can be liquefied, for example, water, dilute acids, oils, alcohols, chlorinated hydrocarbons, halides, such as metal halides, for example, alkali metal or alkaline earth metal halides, as well as other halides and salts.

In some instances it is desirable to maintain a sufficiently raised pressure in the apparatus employed to prevent or reduce evaporation of the liquid surrounding the fused zone. For this purpose, gaseous materials can be used which possess a certain solubility in the surrounding liquid and react with the fused or solid material of the body to be formed, such as, for example, hydrohalides when alkali metal halides are used in the surrounding liquid. The raised pressure can also be provided with the aid of inert gases.

The process according to the invention can also be carried out at subatmospheric pressures especially when materials are to be removed from the surrounding liquid and/or the free hanging fused liquid zone. This manner of operation is especially suited when the material to be shaped is to be purified.

The thermal constants of the material to be melted and shaped must also be taken into consideration in the selection of the surrounding melt or liquid. As there are innumerable materials which can be processed according to the invention, a suitable careful selection must always be made with respect to the particular material in question.

The material to be melted and shaped, for example, can possess a higher melting point than the surrounding liquid medium whereas the boiling point of the latter is higher than the melting point of the material to be shaped. For instance, silicon can be melted and shaped in a fused salt bath of alkali metal halides having a melting point of about 300 to about 1200° C., even though the melting point of silicon is about 1420° C. In this instance it is advantageous to supply electrical high frequency energy inductively to the silicon in order to maintain the free hanging fused zone.

The melting point of the surrounding liquid can also be higher than that of the material to be shaped. In this instance it is advantageous to select material which when melted has a density substantially corresponding to that of the free hanging fused zone. When grains of the material to be shaped are added to the surrounding melt droplets of such material are formed which are suspended in and float on the liquid melt and such droplets are taken up by the downwardly free hanging fused zone. In the measure in which the fused zone grows it is withdrawn upwardly and solidifies to a shaped body. This embodiment has the advantage that the surrounding liquid simultaneously acts as the heating element.

When the boiling point of the surrounding liquid is lower than the melting point of the material to be shaped, it is necessary to take suitable precautions to hinder the evaporation of the surrounding liquid or to replace the evaporated material constantly.

Electrical high frequency energy, energetic electromagnetic radiation sources, electron or ion bombardment, hot gas streams, electric arcs or atomic recombustion energy can be employed as sources of heat for the process according to the invention.

The stability of the downwardly hanging fused zone can be increased or decreased by the application of alternating electro-magnetic fields. For example, the tearing off and dropping of the downwardly hanging fused zone can be hindered by using electrical high frequency, middle frequency or low frequency fields as supporting fields for the downwardly hanging fused zone.

The following examples will serve to illustrate several embodiments of the process according to the invention.

*Example 1*

In order to produce a tube of NaCl having an inner diameter of 10 mm. and a wall thickness of 3 mm., the desired original piece was first prepared from a suitable fused salt block by boring out a 10 mm. hole. This starting piece was mounted so that its lower end hung freely in the apparatus such as shown in the drawing and so that it could be moved vertically. The lower end thereof was then fused to a ring shape fused zone with the aid of a focusing source of ultra red irradiation. Then, slowly, single grains of highly pure NaCl were supplied to the fused zone with the aid of a tapping arrangement and the tube lengthened by slowly withdrawing it upwardly. At the same time a diminished pressure of 100 mm. Hg was maintained in the apparatus. When the original piece of material was single crystal material it was possible when maintaining a sufficiently slow rate of growth to have its further growth also in the single crystal state. When the tube had grown to the desired length, for example, 10 cm., the ring shaped fused zone was permitted to run together into a drop and then permitted to solidify. It was possible in this manner to produce combined shapes by subsequent sawing or cutting. For example, by cutting through the tube which was closed at both ends longitudinally it was possible to produce two troughs in one operation.

*Example 2*

In order to produce a titanium rod 10 mm. in diameter a titanium rod having a diameter of about 11 mm. was employed as a starting piece. Such titanium starting piece contained a total of 0.001% of impurities. It was, however, possible to use a highly pure spectral carbon having a diameter of 8–10 mm. as the starting piece. The procedure employed was analogous to that of Example 1. A fused drop was produced on the free lower end of the rod with the aid of high frequency energy, ion or electron bombardment or an electron torch and solid titanium was supplied to the fused titanium drop in the form of titanium sponge, titanium wire, titanium granules or sintered titanium rods. The slowly lengthening rod was uniformly raised until it had reached a length of 50 cm. The pressure within the apparatus in which the titanium was melted was maintained at $10^{-5}$ to below $10^{-6}$ mm. Hg with the aid of a vacuum pump. It was possible in this way to produce polycrystalline, ductile and extremely pure titanium rods.

When another solid metal, such as iron, was supplied together with the solid titanium to the fused titanium drop, it was possible to smelt and shape titanium alloys.

The same procedure can be used for silicon, germanium and other metals. It is again advantageous to employ electric high frequency energy for the supply of heat.

*Example 3*

In order to produce a silicon rod 9 mm. in diameter and 0.7 meter long, a single crystal silicon, 111 oriented rod 6 cm. long and 5 mm. thick was mounted in an apparatus as described in Example 1. A drop of silicon was melted and maintained on the lower free end of the rod with electrical high frequency energy (3–4 mHz.). The water cooled high frequency coil with one winding and a diameter of 16 mm. was, in this instance, mounted within the enclosing vessel in order to achieve a better coupling between the silicon drop and the coil. If the coil was placed outside of the vessel it was also possible to fuse a drop on the end of the silicon rod but in this instance considerably more electric high frequency energy was required as the electrical coupling is lower because of the larger coil diameter (30 mm.) required.

A pressure of $10^{-6}$ mm. Hg was maintained in the vessel with the aid of a mercury diffusion pump during the formation of the silicon drop and during the production of the rod.

As soon as a well developed drop of silicon hangs on the silicon rod provided, silicon grains 0.5–2 mm. in diameter or needle shaped silicon was supplied thereto so that it was enlarged. At the same time the growing rod was raised. Silicon grains which fell to the bottom of the vessel were contacted with and raised up with the silicon drop. The silicon rod was raised out of the high frequency end at a velocity of 1.5 to 2 mm. per minute. The rod produced was a single crystal over its entire length and had a highly lustrous surface.

The specific electrical resistance of the starting silicon granules or needles and of the rod produced indicated that the purity of the silicon had also been improved.

|                           | Ohm cm.    |
|---------------------------|------------|
| Silicon grains or needles | About 50   |
| Rod produced              | Average 800|

*Example 4*

A drop of silicon was melted on a silicon rod 12 mm. in diameter and 8 cm. long, as described in Example 3, employing the same pressures. After such drop was well developed, a thin polycrystalline silicon rod 2-3 mm. in diameter was supplied to such drop from below in the direction of the extension of the axis of the silicon rod. At the same time the growing silicon rod was raised. The diameter of the rod being raised was 10 mm. and had a variation in diameter of $2/10$ mm. It was found that in this instance when the rod was raised at a velocity greater than 12 mm. per minute single crystal growth no longer occurred. Below this velocity it was, however, again possible to produce single crystal rods.

*Example 5*

A porous glass rod was mounted at its upper end so that it could be moved vertically. A drop of m-dinitrobenzene (M.P. 88° C.) was melted on its lower end and then spherical granules of m-dinitrobenzene 0.5–2 mm. in diameter were supplied laterally to said fused drop while simultaneously raising the slowly growing m-dinitrobenzene rod. In this instance a sharply confined stream of nitrogen at a temperature of about 100° C. which was directed upwardly against the melted drop was employed as the source of heat. A pressure of about 1.1 atmospheres was maintained in the apparatus. A highly pure m-dinitrobenzene rod 5–6 mm. in diameter was produced. Small quantities of dinitrobenzene and the impurities were carried away with the stream of nitrogen.

*Example 6*

A salt mixture of 40% by weight of NaCl and 60% by weight of KCl to which 0.1% by weight of KF had been added was melted by inductive heating in a quartz tube closed at the bottom 30 mm. in diameter with the aid of a high frequency coil surrounding the quartz tube to provide a fused salt bath about 4 cm. deep. The melting point of the salt mixture was about 700° C. When the temperature of the fused salt bath reached about 1000° C. the lower end of a silicon rod 5 mm. in diameter was immersed therein about 1 cm. deep and the high frequency energy increased so that a drop of fused silicon formed on the immersed lower end of the silicon rod. The fused salt bath surrounded this fused drop and about 2–3 mm. of the solid rod thereabove. The upper end of the silicon rod was mounted to permit vertical adjustment of the rod and drop. A light stream of oxygen-free argon (about 3 liters per hour) was supplied above the salt bath. Granular silicon (1–4 mm.) was slowly supplied to the fused salt bath. Individual silicon granules, especially those having gas bubbles attached thereto and therefore having a lower apparent specific gravity, were carried by convection currents of the fused salt bath against the fused silicon drop and were taken up thereby and thereby enlarged such fused drop. The size of the drop was selected so that a silicon rod 10 mm. in diameter could be continuously drawn upwardly. The silicon grains which were so heavy that they sank to the bottom of the quartz tube were brought up by short contact with the fused silicon drop.

A coarse crystalline pore-free silicon rod 10 mm. in diameter and 400 mm. long was produced. The thin salt coating derived from the fused salt bath was washed off with warm water. It was found that the fused salt bath had a purifying action on the silicon supplied thereto in that its $SiO_2$ content decreased from about 0.02% to 0.001% by weight. The purifying action increased with increased fluoride content. The degree of purifying action could also be increased by supplying silicon tetrachloride or hydrogen chloride to the fused salt bath during the smelting of the silicon. This increased purifying action was not only observed when these two substances were passed through the fused salt bath, as it was also found that it would suffice to maintain a cover of the vapors thereof over the fused salt bath. In the latter instance the purifying action increased with increased pressure of the vapor cover. It was possible in this way to remove traces of impurities, for example, phosphorus and boron in concentrations below $10^{-3}$% by weight, contained in silicon which is already highly pure. This is rather interesting in the processing of semi-conductor silicon.

When technically pure silicon is processed, which usually contains more than 1% by weight of impurities, it is advisable to add fresh salt mixture along with the grandular silicon in order to prevent too great a rise in the concentration of impurities dissolved out of the silicon by the fused salt bath.

*Example 7*

The procedure of Example 6 was repeated except that a fused salt bath was employed of 40% by weight of lithium chloride and 60% by weight of potassium chloride to which 0.5% by weight of sodium fluoride and 0.01% of potassium hydrofluoride had been added and a mixture of 90 vol. percent of HCl and 10 vol. percent of silicon tetrafluoride was bubbled through the fused salt bath. The purification effected is indicated in the following table:

|           | Starting Silicon, Percent by weight | Silicon Rod Produced, Percent by weight |
|-----------|-------------------------------------|------------------------------------------|
| Slag      | 0.47                                | 0.001                                    |
| Titanium  | 0.04                                | (¹)                                      |
| Calcium   | 0.47                                | 0.001                                    |
| Iron      | 2.22                                | 0.1                                      |
| Aluminum  | 2.42                                | 0.1                                      |

¹ No longer ascertainable.

When silicon rods thicker than 10–15 mm. in diameter are to be produced, the density of the fused salt bath should be raised, for example, by the addition of rubidium or cesium halides. It is possible in this way to obtain and maintain a larger fused zone and thereby obtain rods of greater cross-section or in the case of tubes tubes with greater wall thickness. Further improvements can also be achieved by the application of electromagnetic supporting fields.

*Example 8*

In this instance granular p-conductive germanium containing less than $10^{-5}$% by weight of impurities was converted to a 30 mm. rod employing a surrounding liquid medium which did not contact the walls of the apparatus.

The 1–2 mm. granules of germanium used as starting material were first dipped into a fused salt bath of about 40% by weight of NaCl and 60% by weight of KCl and $1/100$ to $1/1000$% by weight of phosphorus trichloride to coat such granules with a thin coating of such salt mixture. These coated granules were then supplied to a downwardly free hanging fused germanium drop in which they were melted so as to enlarge the drop and then the rod was slowly raised. The fused germanium zone was stabilized with the aid of an electromagnetic supporting field to prevent its dripping off. The salt mixture supplied with the germanium granules partly cover the fused germanium drop and finally solidify on the germanium rod as it is drawn upwardly. The phosphorus contained in the salt mixture was partially given up to the germanium. A polycrystalline rod of n-conductive germanium was produced.

It was possible to produce single crystal rods or tubes in the same manner if care was taken to maintain about 3–5 mm. of the salt coating on the rod cover the solid-liquid line liquid. If this is not the case the single crystal growth is disturbed.

*Example 9*

A paraffin rod was produced in which a hot liquid was directly used as the source of heat. In this instance a short piece of paraffin fastened to a glass rod was dipped from above about 1 cm. into a 10 cm. deep bath of alcohol and water having a density of about 0.83 contained in a glass tube 40 mm. in diameter. The temperature of the bath was maintained at about 55° C. When the paraffin had melted to a free hanging drop, subdivided paraffin (M.P. 51–53° C., density about 0.83) was dropped into and suspended in the bath. The added paraffin was taken up by the melted drop whereby it was enlarged and the paraffin rod was lengthened by continuous slow withdrawal from the bath.

If the liquid bath contains dyes or respectively the paraffin contains materials which are soluble in the liquid bath, an active material exchange takes place during the growth of the paraffin rod and it is thereby possible to incorporate small quantities of dyes in the paraffin or to dissolve salt like components out of the paraffin.

We claim:

1. In a process for the melting of a material selected from the group consisting of silicon and germanium and shaping bodies therefrom, the steps of providing a downwardly free hanging fused body of such material at the lower end of a solid body of such material, said free hanging fused body being surrounded at its bottom with a liquid in which the material of said fused body is substantially immiscible, supplying, in solid form, further material from which the body is to be shaped to the surface of the free hanging fused body at the lower end of the solid body from an external source through the surrounding liquid medium and fusing said further material in contact with said fused body.

2. A process for the melting of a fusible material selected from the group consisting of silicon and germanium and shaping bodies therefrom which comprises supplying heat to a body of the fusible material in a liquid medium in which said material upon fusion is substantially immiscible to provide and maintain a downwardly free hanging fused body of said material at its lower end surrounded at its bottom by the liquid medium, supplying further material from which the body is to be shaped in solid form to the surface of the free hanging fused body from an external source through the liquid medium, fusing said further material in contact with said fused body to enlarge said fused body and as such fused body is enlarged withdrawing it from the source of heat to permit a portion thereof to solidify and form a solid shaped body.

3. The process of claim 2 in which said liquid is fused alkali metal halide.

References Cited in the file of this patent

UNITED STATES PATENTS

| | | |
|---|---|---|
| 1,502,129 | Starmann | July 22, 1924 |
| 2,280,703 | Hart | Apr. 21, 1942 |
| 2,686,865 | Kelly | Aug. 17, 1954 |
| 2,880,483 | Hanks | Apr. 7, 1959 |
| 2,892,739 | Rusler | June 30, 1959 |
| 2,904,411 | Pfann | Sept. 15, 1959 |
| 2,907,642 | Rummel | Oct. 6, 1959 |
| 2,964,396 | Rummel et al. | Dec. 13, 1960 |

FOREIGN PATENTS

| | | |
|---|---|---|
| 1,017,795 | Germany | Oct. 17, 1957 |